(12) United States Patent
Römer et al.

(10) Patent No.: US 7,951,215 B2
(45) Date of Patent: May 31, 2011

(54) FILTERING PLANT FOR REMOVING DUSTS FROM GASES

(75) Inventors: Harald Römer, Reinbek (DE); Detlef Nuppenau, Salem (DE); Eugen Krüger, Schwarzenbek (DE); Dieter Schmidt, Hamburg (DE); Michael Markl, Grabau (DE); Bernd Granzow, Grabau (DE); Jens Mannshard, Ratzeburg (DE)

(73) Assignee: Fette GmbH, Schwarzenbek (DE)

( * ) Notice: Subject to any disclaimer, the term of this patent is extended or adjusted under 35 U.S.C. 154(b) by 264 days.

(21) Appl. No.: 11/960,980

(22) Filed: Dec. 20, 2007

(65) Prior Publication Data
US 2008/0223009 A1   Sep. 18, 2008

(30) Foreign Application Priority Data
Dec. 22, 2006   (DE) .......................... 10 2006 061 256

(51) Int. Cl.
*B01D 46/00*   (2006.01)
(52) U.S. Cl. .......... 55/302; 55/293; 55/341.1; 55/341.5; 55/350.1; 55/428
(58) Field of Classification Search .......... 96/7; 55/342, 55/302, 428, 430, 431, 341.1, 341.11, 341.2, 55/341.3, 341.4, 341.5, 341.6, 341.7, 293, 55/350.1
See application file for complete search history.

(56) References Cited

U.S. PATENT DOCUMENTS

| 3,146,080 | A | * | 8/1964 | Ruble et al. | 95/268 |
| 3,473,300 | A | * | 10/1969 | Jordan et al. | 55/302 |
| 3,491,518 | A | * | 1/1970 | Williams | 55/284 |
| 3,638,400 | A | * | 2/1972 | Heilmann | 95/73 |
| 3,646,595 | A | * | 2/1972 | Williams | 55/284 |
| 3,985,527 | A | * | 10/1976 | Smithson | 55/341.1 |
| 4,205,931 | A | * | 6/1980 | Singer et al. | 406/109 |
| 4,261,713 | A | * | 4/1981 | Bourdois et al. | 55/302 |
| 4,446,109 | A | * | 5/1984 | Bakke | 422/168 |
| 4,523,933 | A | * | 6/1985 | Laush et al. | 55/431 |
| 4,692,173 | A | * | 9/1987 | Roos | 95/279 |
| 4,759,781 | A | * | 7/1988 | Olson | 96/427 |
| 5,171,338 | A | * | 12/1992 | Baert | 55/302 |
| 2005/0258287 | A1 | * | 11/2005 | Rohde | 241/100 |

FOREIGN PATENT DOCUMENTS

| DE | 3420972 A1 | 12/1985 |
| DE | 92 03 474.8 | 11/1992 |
| DE | 196 52 160 A1 | 6/1998 |

* cited by examiner

*Primary Examiner* — Duane Smith
*Assistant Examiner* — Thomas McKenzie
(74) *Attorney, Agent, or Firm* — Vidas, Arret & Steinkraus

(57) ABSTRACT

A filtering plant for removing dusts from gases, with a plurality of filter units, which are parallel connected to a line for crude gas and the outlets thereof are parallel connected to a line for purified gas, wherein an extraction blowing engine is connected to the line for purified gas, further with an apparatus for cleaning the filter units, which has a lower collecting space for the filter cake with a discharge opening with flap on the lower end of the collecting space, characterized in that the dust discharge openings of all the filter units except one are connected to a common collecting main and the collecting main is connected to the crude gas region of the one filter unit.

4 Claims, 1 Drawing Sheet

FILTERING PLANT FOR REMOVING DUSTS FROM GASES

CROSS-REFERENCE TO RELATED APPLICATIONS

Not applicable.

STATEMENT REGARDING FEDERALLY SPONSORED RESEARCH

Not applicable.

BACKGROUND OF THE INVENTION

It is known that such filtering plants have a plurality of filter units, which are parallel connected to a line for crude gas and to a line for purified gas. Mostly, each filter unit contains a plurality of so-called filter cassettes, through which the crude gas stream flows sequentially, the flow direction being usually from the downside to the upside in doing so. The removed dust particles are deposited on the filter and form a filter cake. Through the growth of the filter cake, the flow resistance of the filter cassette increases. When a certain limit pressure is exceeded therein, a cleaning process of the filter cassette takes place automatically, in a pneumatic way for instance. The filter cake cleaned away is collected in a collecting space below the filter cassette and thereafter it is taken out of the filtering plant.

It is known to install a collecting vessel below each collecting space of a filter unit, into which the filter cake which was cleaned away is filled in. Such a handling is relatively sumptuous, because one collecting vessel has to be provided for each filter unit at a time, which must be replaced by an empty one from time to time.

However, it is also known to connect all the outlets openings of the collecting spaces with each other and to lead the connection line to a central dust collector. An additional conveyor serves for the transportation of the dust into the central dust collector. In this measure, the expense for apparatus is relatively great.

The present invention is based on the objective to provide a filtering plant for removing dusts from gases by which a similar effect as in the central dust collector described immediately above is achieved, but wherein only a significantly reduced expense for apparatus has to be provided, however.

BRIEF SUMMARY OF THE INVENTION

In the filtering plant according to the present invention, the dust discharge openings of all the filter units except one are connected to a common collecting main. The collecting main is connected to the crude gas region of this one filter unit. Preferably, the collecting main is connected to the collecting space of this one filter unit.

The present invention is based on the knowledge that there is a negative pressure in the crude gas region of every filter unit. The filtering plant according to the present invention utilizes this negative pressure to transport dust from the collecting spaces of the other filter units into the collecting space of the one filter unit. Thus, the one filter unit is equipped with a central dust collecting space.

BRIEF DESCRIPTION OF THE DRAWING

An example of the realisation of the present invention is explained in more detail by means of a drawing below.

DETAILED DESCRIPTION OF THE INVENTION

Figure 1:
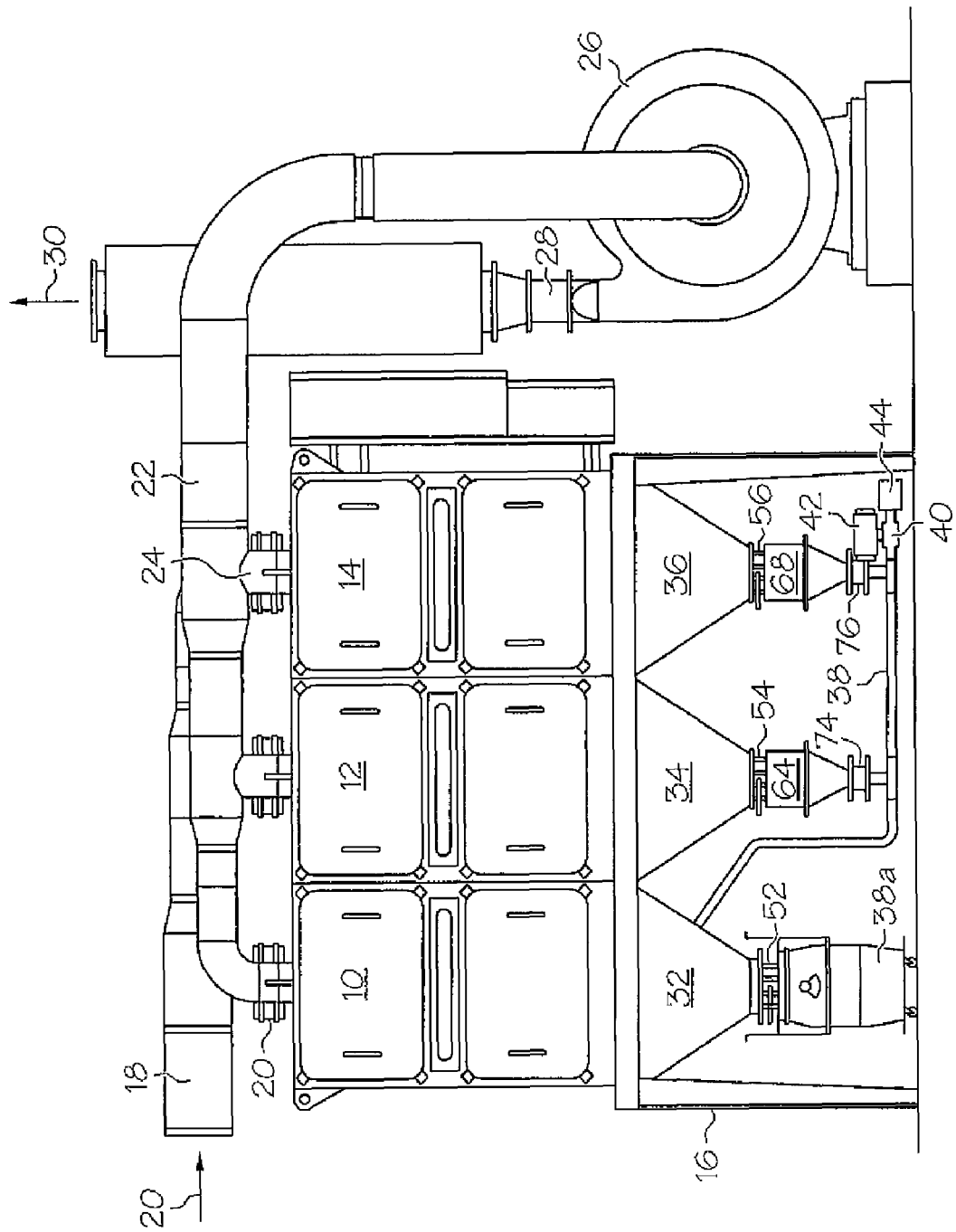
FIG. 1 is a schematic view of the invention.

While this invention may be embodied in many different forms, there are described in detail herein a specific preferred embodiment of the invention. This description is an exemplification of the principles of the invention and is not intended to limit the invention to the particular embodiment illustrated In the filtering plant shown in FIG. 1, three filter units 10, 12 and 14 are arranged side by side. They stand on a common stand 16. A first line 18 is connected to the upper end of the filter units 10 to 14 via connector necks 20. The line 18 is a so-called crude gas line. According to arrow 20, it is charged by a source for crude gas, i.e. dust contaminated gas. A purified gas line 22 is connected to the outlet of the filter units 10 to 14 via corresponding connector necks 24. The purified gas line 22 is connected to the inlet of a blowing engine 26, the outlet 28 of which runs out in the atmosphere, as indicated at 30. On the lower end of each filter unit 10 to 14, a funnel 32, 34, 36 is arranged. Each funnel 32, 34, 36 has a dust outlet opening, which can be closed by a flap 52, 54, 56. Below the flap 54, 56, there is a dust collector 64, 66, which accommodates the dusts arising during the filtration and the filter cleaning process. A second flap 74, 76 may optionally be provided below the dust collectors 64, 66, which provides the connection to the collecting main 38 and which closes the passage to the collecting main 38 during the opening position of the flap 54, 56. The collecting main 38 connects the dust collectors 64, 66 and their dust outlet openings, respectively, with each other.

The one end of the collecting main 38 is connected to the funnel 32 of the filter unit 10. Below the filter unit 10 or the funnel 32, respectively, a catching vessel 38a is arranged. Thus, the collecting space 32 is a central collecting space for all the filter units 10 to 14, the dust or filter cake of which, respectively, is caught in the vessel 38. This takes place through that there is a negative pressure in the collecting space 32 during the operation of the filtering plants. Usually, in such filter units 10 to 14, to which the inlet of the blowing engine 26 is connected, a channel is led downward to the lowermost filter cassette. By doing so, the negative pressure, which creates a flow through the filter cassettes, is existing even in the collecting space 32. Through this, the dust from the other collecting spaces 34, 36 is aspirated and conveyed to the collecting space 36. For this purpose, however, the collecting main 38 must be open at the other end. A valve 40, which can be actuated by a servo actuator 42, is connected to the atmosphere via a filter 44. The valve 40 is opened when dust is to be conveyed from the collecting spaces 34, 36 into the collecting space 32.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A filtering plant for removing dust from gases, with a plurality of filter units, which are parallel connected to a line for crude gas and having outlets which are parallel connected to a line for purified gas, wherein an extraction blowing engine is connected to the line for purified gas, further with an apparatus for cleaning the filter units, which has a lower collecting space for a filter cake, with a dust discharge opening with a flap on the lower end of a collecting space, characterized in that the dust discharge openings of all the filter units except one are connected to a common collecting main and the collecting main is connected to a crude gas region of the one filter unit, and the one filter unit is also connected with the line for purified gas.

2. A filtering plant according to claim 1, characterized in that the collecting main is connected to the collecting space of the one filter unit.

3. A filtering plant for removing dust from gases, with a plurality of filter units, which are parallel connected to a line for crude gas and having outlets which are parallel connected to a line for purified gas, wherein an extraction blowing engine is connected to the line for purified gas, further with an apparatus for cleaning the filter units, which has a lower collecting space for a filter cake, with a dust discharge opening with a flap on the lower end of a collecting space, characterized in that the dust discharge openings of all the filter units except one are connected to a common collecting main and the collecting main is connected to a crude gas region of the one filter unit, the line which connects the outlets of the filter units to the collecting space of filter unit being provided with a valve which is opened when the dust from the collection spaces is to be conveyed to the collecting space of the filter unit, and the one filter unit is also connected with the line for purified gas.

4. A filtering plant for removing dust from gases, with a plurality of filter units, which are parallel connected to a line for crude gas and having outlets which are parallel connected to a line for purified gas, wherein an extraction blowing engine is connected to the line for purified gas, further with an apparatus for cleaning the filter units, which has a lower collecting space for a filter cake, with a dust discharge opening with a flap on the lower end of a collecting space, characterized in that the dust discharge openings of all the filter units except one are connected to a common collecting main and the collecting main is connected to a crude gas region of the one filter unit, and the one filter unit is also connected with the line for purified gas, the filter units except one, each having a further flap between the filter unit and the common collecting main.

\* \* \* \* \*